United States Patent
Lasserre et al.

(10) Patent No.: US 12,537,970 B2
(45) Date of Patent: Jan. 27, 2026

(54) METHOD AND APPARATUS OF ENCODING/DECODING POINT CLOUD GEOMETRY DATA CAPTURED BY A SPINNING SENSORS HEAD

(71) Applicant: Beijing Xiaomi Mobile Software Co., Ltd., Beijing (CN)

(72) Inventors: Sebastien Lasserre, Beijing (CN); Shuo Gao, Beijing (CN); Jonathan Taquet, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 195 days.

(21) Appl. No.: 18/553,793

(22) PCT Filed: Oct. 13, 2021

(86) PCT No.: PCT/CN2021/123663
§ 371 (c)(1),
(2) Date: Oct. 3, 2023

(87) PCT Pub. No.: WO2022/213570
PCT Pub. Date: Oct. 13, 2022

(65) Prior Publication Data
US 2024/0187631 A1    Jun. 6, 2024

(30) Foreign Application Priority Data
Apr. 8, 2021 (EP) .................................. 21305456

(51) Int. Cl.
*H04N 19/46* (2014.01)
*H04N 19/124* (2014.01)
*H04N 19/597* (2014.01)

(52) U.S. Cl.
CPC ........... *H04N 19/46* (2014.11); *H04N 19/124* (2014.11); *H04N 19/597* (2014.11)

(58) Field of Classification Search
None
See application file for complete search history.

(56) References Cited

U.S. PATENT DOCUMENTS

2015/0373334 A1    12/2015  Rapaka et al.
2019/0041518 A1*    2/2019  Spickermann .......... G01S 17/08
(Continued)

FOREIGN PATENT DOCUMENTS

WO    WO 2020248187 A1    12/2020

OTHER PUBLICATIONS

ISO/IEC JTC 1/SC 29/WG 7, "Insert Document", MPEG 3D Graphics Coding, Convenorship: AFNOR (France), Dec. 31, 2020, 150 pages.
(Continued)

*Primary Examiner* — Christopher Braniff
(74) *Attorney, Agent, or Firm* — Finnegan, Henderson, Farabow, Garrett & Dunner, L.L.P.

(57) ABSTRACT

A method of encoding a point cloud into a bitstream of encoded point cloud data representing a physical object is provided. The method includes: encoding, into the bitstream, azimuthal angle data ($\phi_{coded,n}$) representative of an azimuthal angle ($\phi(P_n)$) responsive to a capture angle of a sensor that captured a point of the point cloud, wherein the encoding is based on a boundary value (B) that depends on sensor characteristics, and an absolute value of the azimuthal angle data ($\phi_{coded}$) is bounded by the boundary value.

17 Claims, 9 Drawing Sheets

(56) References Cited

U.S. PATENT DOCUMENTS

2019/0204423 A1\* 7/2019 O'Keeffe ................ G01S 17/89
2022/0207780 A1\* 6/2022 Ramasubramonian ......................
                                                    H04N 19/172

OTHER PUBLICATIONS

Office Action issued in Russian Application No. 2023128275/07 dated Apr. 4, 2024, 14 pages.

\* cited by examiner

METHOD AND APPARATUS OF ENCODING/DECODING POINT CLOUD GEOMETRY DATA CAPTURED BY A SPINNING SENSORS HEAD

CROSS-REFERENCE TO RELATED APPLICATION

This application is a National Stage of International Application No. PCT/CN2021/123663, filed on Oct. 13, 2021, which claims priority to European Patent Application No. 21305456.2 filed on Apr. 8, 2021, the entire content of both of which is hereby incorporated by reference.

FIELD

The present disclosure generally relates to point cloud compression and, in particular to methods and apparatus of encoding/decoding point cloud geometry data captured by a spinning sensor head.

BACKGROUND

The present section is intended to introduce the reader to various aspects of art, which may be related to various aspects of at least one exemplary embodiments of the present disclosure that is described and/or claimed below. This discussion is believed to be helpful in providing the reader with background information to facilitate a better understanding of the various aspects of the present disclosure.

As a format for the representation of 3D data, point clouds have recently gained traction as they are versatile in their capability in representing all types of physical objects or scenes. Point clouds may be used for various purposes such as culture heritage/buildings in which objects like statues or buildings are scanned in 3D in order to share the spatial configuration of the object without sending or visiting it. Also, it is a way to ensure preserving the knowledge of the object in case it may be destroyed: for instance, a temple by an earthquake. Such point clouds are typically static, colored and huge.

Another use case is in topography and cartography in which using 3D representations allows for maps that are not limited to the plane and may include the relief. Google Maps is now a good example of 3D maps but uses meshes instead of point clouds. Nevertheless, point clouds may be a suitable data format for 3D maps and such point clouds are typically static, colored and huge.

Virtual Reality (VR), Augmented Reality (AR) and immersive worlds have recently become a hot topic and are foreseen by many as the future of 2D flat video. The basic idea is to immerse the viewer in a surrounding environment, in contrast to a standard TV that only allows the viewer to look at the virtual world in front of him/her. There are several gradations in the immersivity depending on the freedom of the viewer in the environment. A point cloud is a good format candidate for distributing VR/AR worlds.

The automotive industry, and more particularly foreseen autonomous cars, are also domains in which point clouds may be intensively used. Autonomous cars should be able to "probe" their environment to make good driving decisions based on the detected presence and nature of their immediate nearby objects and road configuration.

A point cloud is a set of points located in a tridimensional (3D) space, optionally with additional values attached to each of the points. These additional values are usually called attributes. Attributes may be, for example, three-component colors, material properties like reflectance and/or two-component normal vectors to a surface associated with a point.

A point cloud is thus a combination of a geometry (locations of the points in a 3D space usually represented by 3D cartesian coordinates x, y and z) and attributes.

Point clouds may be captured by various types of devices like an array of cameras, depth sensors, lasers (light detection and ranging, also known as Lidars), radars, or may be computer-generated (for example in movie post-production). Depending on the use cases, points clouds may have from thousands to up to billions of points for cartography applications. Raw representations of point clouds require a very high number of bits per point, with at least a dozen of bits per cartesian coordinate x, y or z, and optionally more bits for the attribute(s), for instance three times 10 bits for the colors.

It is important in many applications to be able to either distribute point clouds to an end-user or store them in a server by consuming only a reasonable amount of bitrate or storage space, while maintaining an acceptable (or preferably very good) quality of experience. Efficient compression of these point clouds is a key point in order to make the distribution chain of many immersive worlds practical.

Compression may be lossy (like in video compression) for the distribution to and visualization by an end-user, for example on AR/VR glasses or any other 3D-capable device. Other use cases do require lossless compression, like medical applications or autonomous driving, to avoid altering the results of a decision obtained from the subsequent analysis of the compressed and transmitted point cloud.

SUMMARY

According to a first aspect of the present disclosure, there is provided a method of encoding a point cloud into a bitstream of encoded point cloud data representing a physical object, comprising encoding, into the bitstream, azimuthal angle data representative of an azimuthal angle responsive to a capture angle of a sensor that captured a point of the point cloud. Said encoding is based on a boundary value that depends on sensor characteristics and such that the absolute value of said azimuthal angle data is bounded by said boundary value.

According to a second aspect of the present disclosure, there is provided a method of decoding a point cloud, from a bitstream of encoded point cloud data representing a physical object, comprising decoding, from the bitstream, azimuthal angle data representative of an azimuthal angle responsive to a capture angle of a sensor that captured a point of the point cloud, wherein said decoding is based on a boundary value that depends on sensor characteristics and such that the absolute value of said azimuthal angle data is bounded by said boundary value.

According to a third aspect of the present disclosure, there is provided a bitstream of encoded point cloud data representing a physical object, comprising azimuthal angle data representative of an azimuthal angle responsive to a capture angle of a sensor that captured a point of the point cloud and data representative of a boundary value (B) that depends on sensor characteristics and used to decode said azimuthal angle data such that the absolute value of said azimuthal angle data is bounded by said boundary value.

According to a fourth aspect of the present disclosure, there is provided an apparatus of encoding a point cloud into a bitstream of encoded point cloud data representing a physical object. The apparatus comprising one or more processors configured to carry out a method according to the first aspect of the present disclosure.

According to a fifth aspect of the present disclosure, there is provided an apparatus of decoding a point cloud from a bitstream of encoded point cloud data representing a physical object. The apparatus comprising one or more processors configured to carry out a method according to the second aspect of the present disclosure.

According to a sixth aspect of the present disclosure, there is provided a computer program product including instructions which, when the program is executed by one or more processors, causes the one or more processors to carry out a method according to the first aspect of the present disclosure.

According to a seventh aspect of the present disclosure, there is provided a non-transitory storage medium carrying instructions of program code for executing a method according to the first aspect of the present disclosure.

According to an eighth aspect of the present disclosure, there is provided a computer program product including instructions which, when the program is executed by one or more processors, causes the one or more processors to carry out a method according to the second aspect of the present disclosure.

According to a nineth aspect of the present disclosure, there is provided a non-transitory storage medium carrying instructions of program code for executing a method according to the second aspect of the present disclosure.

BRIEF DESCRIPTION OF THE DRAWINGS

Reference will now be made, by way of example, to the accompanying drawings which show exemplary embodiments of the present disclosure, and in which.

Similar reference numerals may have been used in different figures to denote similar components.

DETAILED DESCRIPTION

Figure 1:
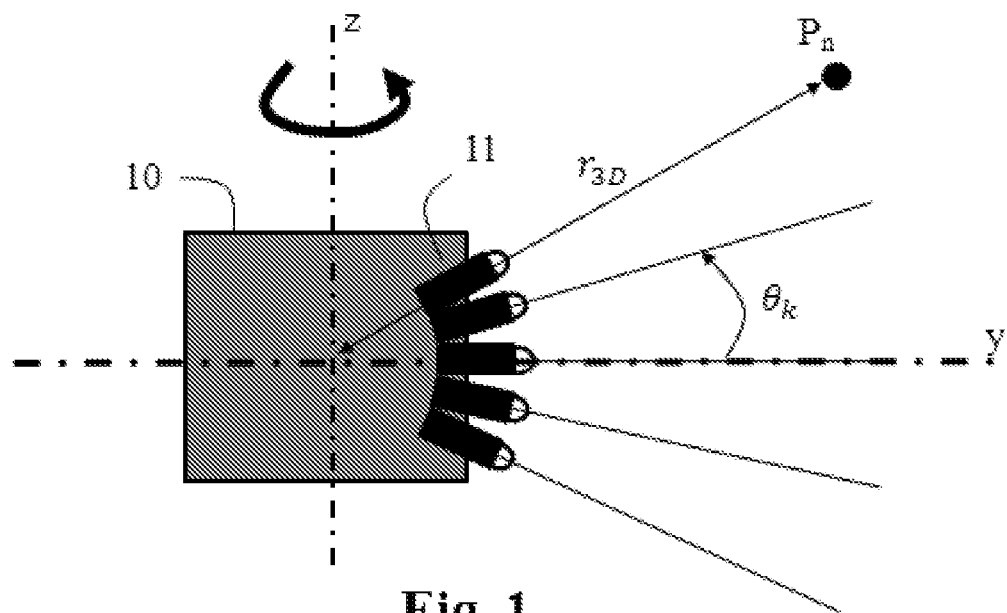
FIG. 1 illustrates a side view of a sensors head and some of its parameters in accordance with related art.

At least one of the exemplary embodiments is described more fully hereinafter with reference to the accompanying figures, in which examples of at least one of the exemplary embodiments are illustrated. An exemplary embodiment may, however, be embodied in many alternate forms and should not be construed as limited to the examples set forth herein. Accordingly, it should be understood that there is no intent to limit exemplary embodiments to the particular forms disclosed. On the contrary, the disclosure is intended to cover all modifications, equivalents, and alternatives falling within the spirit and scope of the present disclosure.

When a figure is presented as a flow diagram, it should be understood that it also provides a block diagram of a corresponding apparatus. Similarly, when a figure is presented as a block diagram, it should be understood that it also provides a flow diagram of a corresponding method/process.

As described above, it is important in many applications to be able to distribute dynamic point clouds to an end-user. Efficient compression of these dynamic point clouds is a key point in order to make the distribution chain of many immersive worlds practical.

Until recently, point cloud compression (aka PCC) was not addressed by the mass market and no standardized point cloud codec was available. In 2017, the standardization working group ISO/JCT1/ SC29/ WG11, also known as Moving Picture Experts Group or MPEG, has initiated work items on point cloud compression. This has led to two standards, namely MPEG-I part 5 (ISO/IEC 23090-5) or Video-based Point Cloud Compression (V-PCC)

MPEG-I part 9 (ISO/IEC 23090-9) or Geometry-based Point Cloud Compression (G-PCC)

The V-PCC coding method compresses a point cloud by performing multiple projections of a 3D object to obtain 2D patches that are packed into an image (or a video when dealing with dynamic point clouds). Obtained images or videos are then compressed using already existing image/video codecs, allowing for the leverage of already deployed image and video solutions. By its very nature, V-PCC is efficient only on dense and continuous point clouds because image/video codecs are unable to compress non-smooth patches as would be obtained from the projection of, for example, Lidar-captured sparse geometry data.

The G-PCC coding method has two schemes for the compression of a captured sparse geometry data.

The first scheme is based on an occupancy tree, being locally any type of tree among octree, quadtree or binary tree, representing the point cloud geometry. Occupied nodes are split down until a certain size is reached, and occupied leaf nodes provide the 3D locations of points, typically at the center of these nodes. The occupancy information is carried by occupancy flags signaling the occupancy status of each of the child nodes of nodes. By using neighbor-based prediction techniques, high level of compression of the occupancy flags can be obtained for dense point clouds. Sparse point clouds are also addressed by directly coding the position of point within a node with non-minimal size, by stopping the tree construction when only isolated points are present in a node; this technique is known as Direct Coding Mode (DCM).

The second scheme is based on a predictive tree in which each node represents the 3D location of one point and the parent/child relation between nodes represents spatial prediction from parent to children. This method can only address sparse point clouds and offers the advantage of lower latency and simpler decoding than the occupancy tree. However, compression performance is only marginally better, and the encoding is complex, relatively to the first occupancy-based method, because the encoder must intensively look for the best predictor (among a long list of potential predictors) when constructing the predictive tree.

In both schemes, attribute (de)coding is performed after complete geometry (de)coding, leading practically to a two-pass coding.

An important use case is the transmission of sparse geometry data captured by a spinning sensor head, e.g. a spinning Lidar head, mounted on a moving vehicle. This usually requires a simple and low-latency embarked encoder. Simplicity is required because the encoder is likely to be deployed on computing units which perform other processing in parallel, such as (semi-) autonomous driving, thus limiting the processing power available to the point cloud encoder. Low latency is also required to allow for fast transmission from the car to a cloud in order to have a real-time view of the local traffic, based on multiple-vehicle acquisition, and take adequate fast decision based on the traffic information. While transmission latency can be low enough by using 5G, the encoder itself shall not introduce too much latency due to coding. Also, compression performance is extremely important since the flow of data from millions of cars to the cloud is expected to be extremely heavy.

Specific priors related to sparse geometry data captured by a spinning sensor head have been already exploited to get very efficient encoding/decoding methods.

Figure 2:
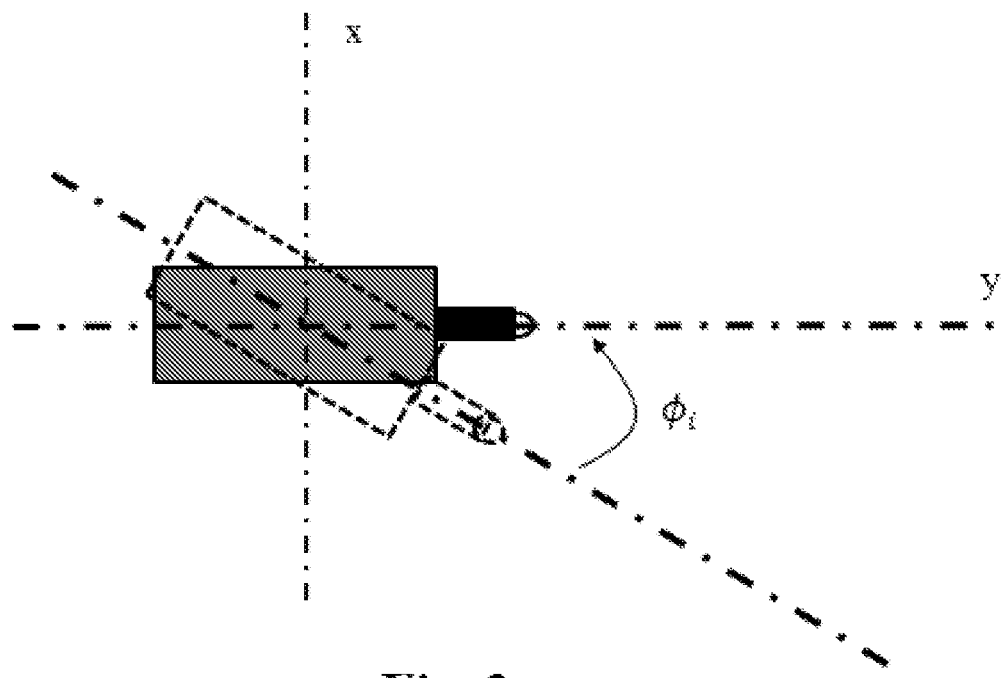
FIG. 2 illustrates a top view of the sensors head and some of its parameters in accordance with related art.

For example, G-PCC exploits the elevation angle (relative to the horizontal ground) of capture from a spinning sensor head as depicted on FIGS. 1 and 2. A spinning sensor head 10 comprises a set of sensors 11 (for example lasers), here five sensors are represented. The spinning sensor head 10 may spin around a vertical axis z to capture geometry data of a physical object, i.e. the 3D locations of points of the point cloud. The geometry data captured by the spinning sensor head is then represented in spherical coordinates ($r_{3D}$, $\phi$, $\theta$), where $r_{3D}$ is the distance of a point P from the spinning sensor head's center, $\phi$ is an azimuthal angle of the sensor head's spin relative to a referential, and $\theta_k$ is an elevation angle of a sensor k of the spinning sensor head relative to a horizontal referential plane.

Figure 3:
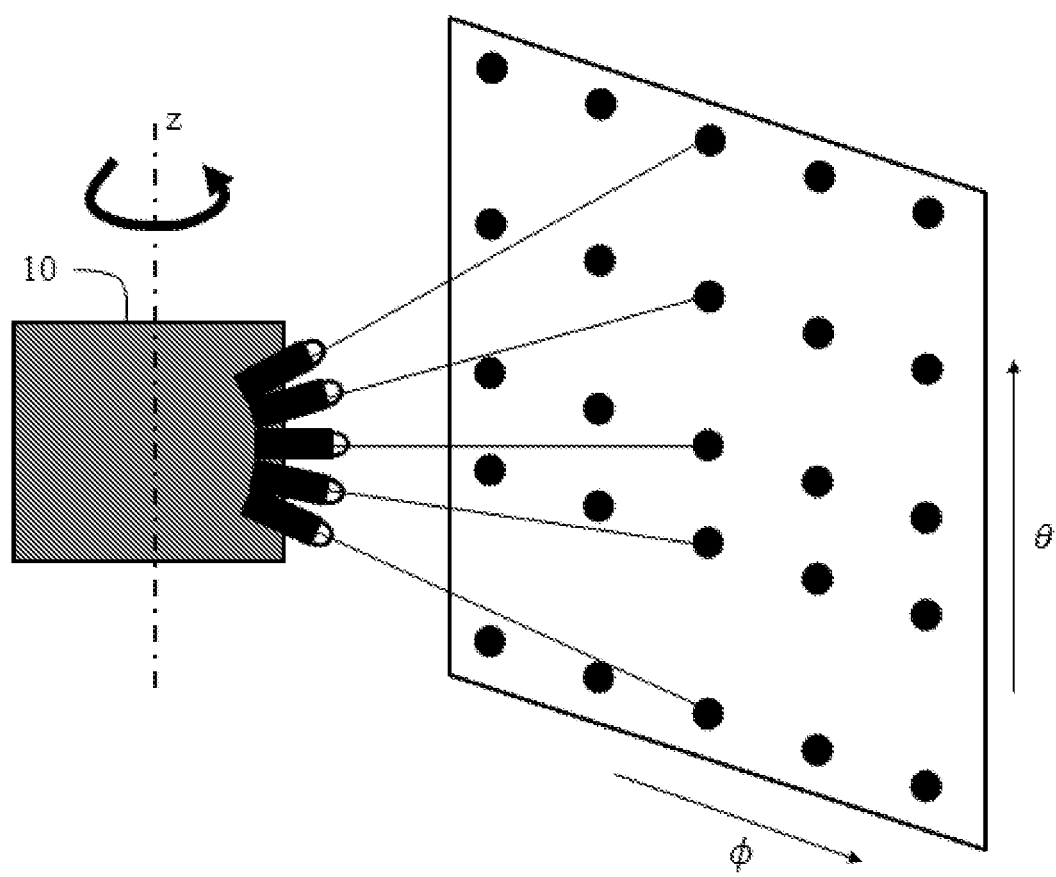
FIG. 3 illustrates a regular distribution of data captured by a spinning sensors head in accordance with related art.

A regular distribution along the azimuthal angle has been observed on geometry data captured by a spinning sensor head as depicted on FIG. 3. This regularity is used in G-PCC to obtain a quasi 1D representation of the point cloud where, up to noise, only a radius $r_{3D}$ belongs to a continuous range of values while the angles $\phi$ and $\theta$ take only a discrete number of values $\phi_i, \forall i=0$ to I-1 where I is a number of azimuthal angles used for the capture of the points and $\theta_k \forall k=0$ to K-1 where K is a number of sensors of the spinning sensor head 10. Basically, G-PCC represents sparse geometry data captured by a spinning sensor head on a 2D discrete angular plane ($\phi$, $\theta$) as depicted on FIG. 3, together with a radius value $r_{3D}$ for each point.

This quasi 1D property has been exploited in G-PCC in both the occupancy tree and the predictive tree by predicting, in the spherical coordinates space, the location of a current point based on an already coded point by using the discrete nature of angles.

Figure 4:
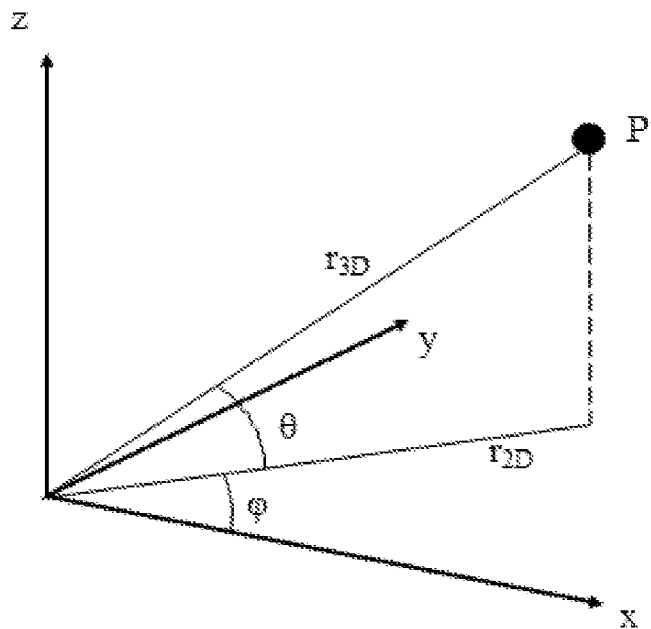
FIG. 4 illustrates a representation of a point in a 3D space in accordance with related art.

More precisely, the occupancy tree uses DCM intensively and entropy codes the direct locations of points within a node by using a context-adaptive entropy coder. Contexts are then obtained from the local conversion of the point locations into angular coordinates ($\phi$, $\theta$) and from the location of these angular coordinates relative to discrete angular coordinates ($\phi_i$, $\theta_k$) obtained from already coded points. The predictive tree directly codes a first version of a point location in the angular coordinates ($r_{2D}$, $\phi$, $\theta$), where $r_{2D}$ is the projected radius on the horizontal xy plane as depicted on FIG. 4, using the quasi 1D nature ($r_{2D}$, $\phi_i$, $\theta_k$) of this coordinate space. Then, angular coordinates ($r_{2D}$, $\phi$, $\theta$) are coded. They are also converted into 3D cartesian coordinates (x,y,z) and a xyz residual is coded to tackle the errors of coordinate conversion, the approximation of elevation and azimuthal angles and potential noise.

Figure 5:
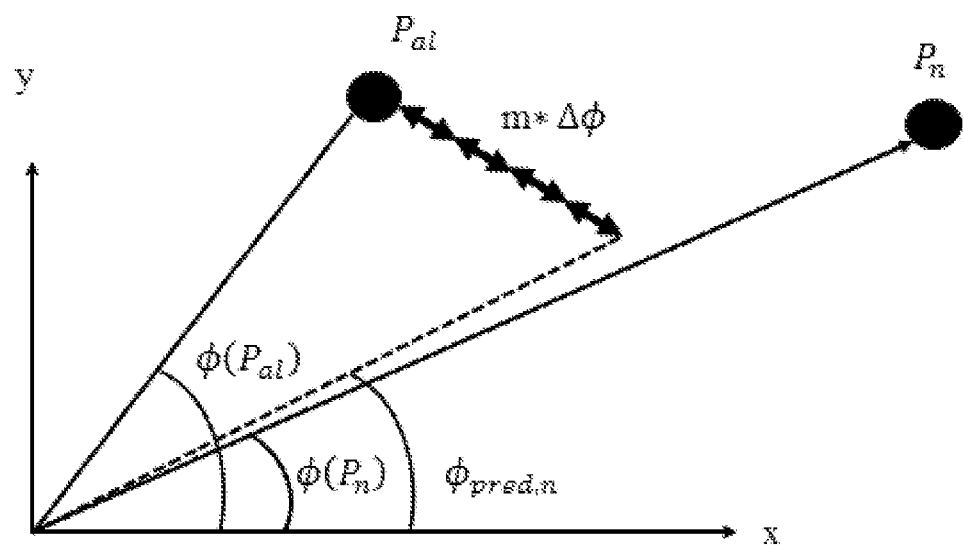
FIG. 5 illustrates a predictive encoding of azimuthal angles in accordance with related art.

Coding the azimuthal angle $\phi(P_n)$ responsive to a capture angle of a sensor that captured a point $P_n$ of the point cloud, may profit from a prediction scheme as depicted in FIG. 5. A prediction angle $\phi_{pred,n}$ for a point $P_n$ of the point cloud is computed from an angle $\phi(P_{al})$ of an already coded point $P_{al}$ by shifting the latter by a multiple of an elementary azimuthal shift $\Delta\phi$:

$$\phi_{pred,n} = \phi(P_{al}) + m^*\Delta\phi \quad (1)$$

where m is an integer value chosen such that $\phi_{pred,n}$ is the closest possible from the original azimuthal angle $\phi(P_n)$ of point $P_n$.

A residual azimuthal angle $\phi_{res,n}$ (the index n indicates that the residual azimuthal angle is relative to the point $P_n$) is then computed by:

$$\phi_{res,n} = \phi(P_n) - \phi_{pred,n} = \phi(P_n) - \phi(P_{al}) - m^*\Delta\phi \quad (2)$$

Both the integer m and the residual azimuthal angle $\phi_{res,n}$ are coded in a bitstream.

At the decoding side, the integer m and the residual azimuthal angle $\phi_{res,n}$ are decoded from the bitstream and the decoded azimuthal angle $\phi_{dec,n}$ are obtained by:

$$\phi_{dec,n} = \phi_{res,n} + \phi_{pred,n} = \phi_{res,n} + \phi(P_{al}) + m^*\Delta\phi \quad (3)$$

The other spherical coordinates ($r_{2D}$, $\theta$) and the xyz residual are also decoded. The 3D cartesian coordinates (x,y,z) of points of the point cloud are then obtained from the decoded xyz residual and 3D cartesian coordinates obtained by converting the decoded spherical coordinates ($r_{2D}$, $\phi$, $\theta$).

The European patent application n°EP20306672.5 describes another encoding/decoding method that exploits specific priors related to sparse geometry captured by a spinning sensor head.

Figure 6:
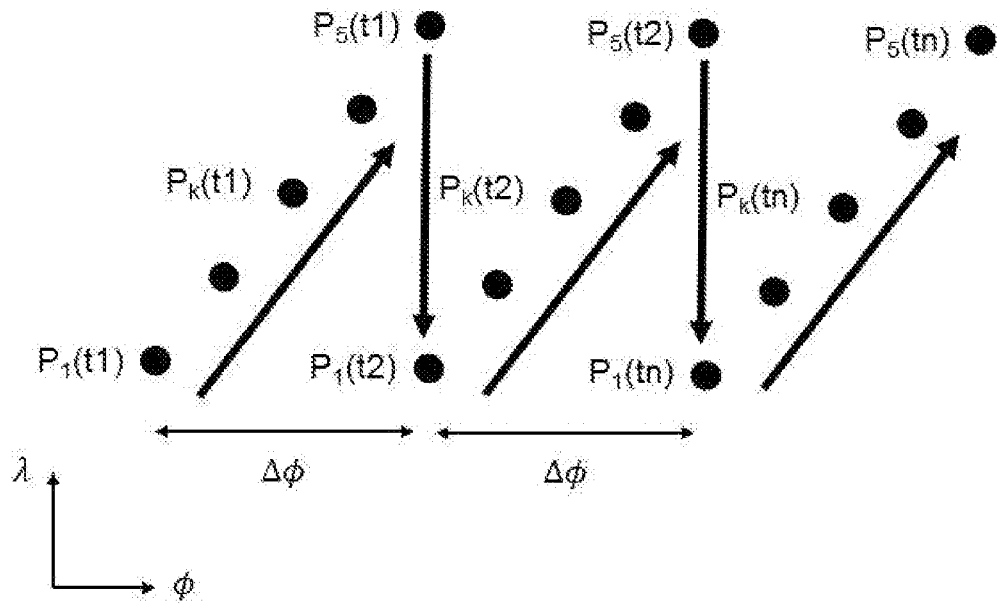
FIG. 6 illustrates an example of captured point represented in a 2D space in accordance with one exemplary embodiment of the present disclosure.

The captured 3D locations of points of a point cloud are represented in a 2D coordinates ($\phi$, $\lambda$) system, as depicted on FIG. 6, together with radius values $r_{2D}$ or $r_{3D}$. This representation is denoted "one-chain coding" as points are represented in a single chain of points, each point having a single successor. The coordinate $\phi$ is the azimuthal angle of the sensor head's spin whose discrete values are denoted $\phi_i$ ($\forall i=0$ to I-1). The coordinate $\lambda$ is a sensor index whose discrete values are denoted $\lambda_k$ ($\forall k=0$ to K-1). The radius $r_{2D}$ or $r_{3D}$ belongs to a continuous range of values.

Due to the regular spin (rotation) of the sensors head and the continuous capture with fixed time interval, the azimuthal distance between two points probed by a same sensor is a multiple of an elementary azimuthal shift $\Delta\phi$ as depicted on FIG. 6. Then, for example, at a first captured time t1, five points $P_1(t1), \ldots, P_k(t1), \ldots P_5(t1)$ are probed by the five sensors of the spinning sensor head 10 of FIG. 1 with an azimuthal angle $\phi_1$, at a second capture time t2, five points $P_1(t2), \ldots, P_k(t2), \ldots P_5(t2)$ are probed by the sensors of the spinning sensor head 10 with an azimuth angle $\phi_2 = \phi_1 + \Delta\phi$, and so on. Consequently, the discrete value $\phi_1$ may be seen as the quantized value of the azimuthal angles $\phi$ of the points $P_1(t1), \ldots, P_k(t1), \ldots P_5(t1)$; quantization being obtained by a quantization step $\Delta\phi$ (also denoted elementary azimuthal shift). Similarly, the discrete value $\phi_2$ may be seen as the quantized value of the azimuthal angles $\phi$ of the points $P_1(t2), \ldots, P_k(t2), \ldots P_5(t2)$.

At the encoding side, for each point $P_n$ of the point cloud, a sensor index $\lambda_{k(n)}$ (among the set of sensor indices $\lambda_k$ ($\forall k=0$ to $K-1$)) associated with a sensor that captured the point $P_n$, an azimuthal angle $\phi_{i(n)}$ (among the set of discrete angles $\phi$ ($\forall i=0$ to $I-1$)) representing a capture angle of said sensor and a radius value $r_n$ of spherical coordinates of the point $P_n$ are obtained by converting 3D cartesian coordinates representing the 3D location of the captured point $P_n$. These 3D cartesian coordinates may be output of the sensors head. For sake of simplicity, $\lambda_{k(n)}$ and the index $i(n)$ will be respectively denoted $\lambda_n$ and $\phi_n$ hereafter. Consequently, $\phi_n$ is not an angle but an index i ($\forall i=0$ to $I-1$)) pointing to an angle $\phi_i$. Nevertheless, because there is an unambiguous relation between the index $\phi_n$ and the canonically associated azimuthal angle $\phi_{i(n)} = \phi_{\phi n}$, the quantity $\phi_n$ is still referred as an azimuthal angle.

Next, points of the point cloud are ordered based on the azimuthal angles $\phi_n$ and the sensor indices $\lambda_n$ according to a lexicographic order based first on the azimuthal angle and then on the sensor index. Referring back to FIG. 6, the ordered captured points are $P_1(t1), \ldots, P_k(t1), \ldots, P_5(t1), P_1(t2), \ldots, P_k(t2), \ldots, P_5(t2), \ldots, P_1(tn), \ldots, P_k(tn), \ldots P_5(tn)$.

The order index $o(P_n)$ of a point $P_n$ is obtained by:

$$o(P_n) = \phi_n * K + \lambda_n$$

Alternatively, the points are ordered according to a lexicographic order based first on the sensor index and then on the azimuthal angle.

The order index $o(P_n)$ of a point $P_n$ is obtained by:

$$o(P_n) = \lambda_n * I + \phi_n$$

Next, order index differences $\Delta o_n$ representing, each, a difference between order indices of two consecutive points $P_{n-1}$ and $P_n$ (for n=2 to N), are obtained by:

$$\Delta o_n = o(P_n) - o(P_{n-1})$$

The order index $o(P_1)$ of the first point $P_1$ may be directly coded into the bitstream. This is equivalent to arbitrary setting the order index of a virtual zero-th point to zero, i.e. $o(P_0) = 0$, and coding $\Delta o_1 = o(P_1) - o(P_0) = o(P_1)$.

Given the order index $o(P_1)$ of the first point and the order differences $\Delta o_n$, one can recursively reconstruct the order index $o(P_n)$ of any point $P_n$ by $$o(P_n) = o(P_{n-1}) + \Delta o_n$$

and then, sensor indices $\lambda_n$ and azimuthal angle $\phi_n$ are retrieved by $$\lambda_n = o(P_n) \text{ modulo } K \quad (4)$$

$$\phi_n = o(P_n)/K \quad (5)$$

where the division/K is the integer division (aka Euclidian division). Therefore, $o(P_1)$ and $\Delta o_n$ are an alternative representation of $\lambda_n$ and $\phi_n$.

Figure 7:
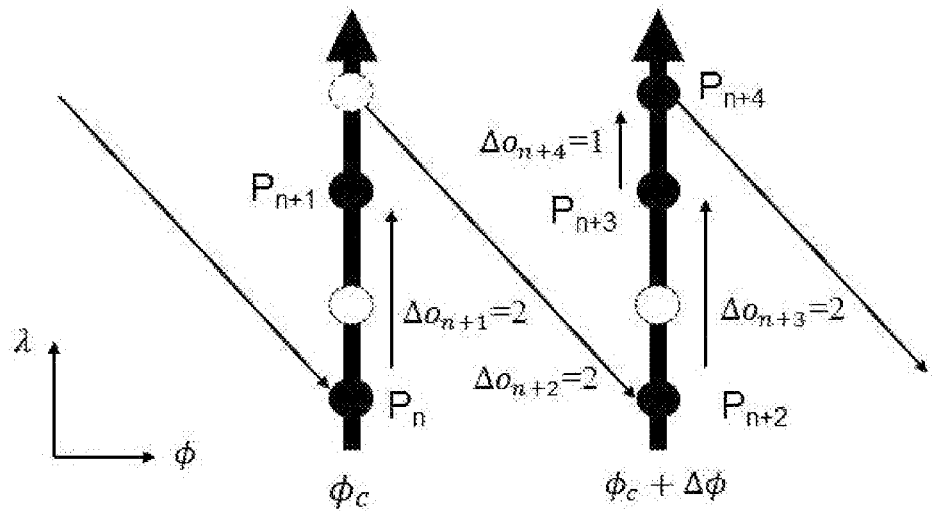
FIG. 7 illustrates an example of encoded ordered points in accordance with one exemplary embodiment of the present disclosure.

Order indices $o(P_n)$ associated with ordered points are encoded, in the bitstream, by encoding the order index $o(P_1)$ and the (N-1) order index differences $\Delta o_n$ ($\forall n=2$ to N) where N is the number of ordered points. Each order index differences $\Delta o_n$ represents a difference between order indices associated with two consecutive ordered points. On FIG. 7, five ordered points are represented (black circles): two points $P_n$ and $P_{n+1}$ were captured in time t1 with an angular angle $\phi_c$ (among the $\phi_i$'s) and three points were captured in time t2 with an angular angle $\phi_c + \Delta\phi$. Assuming the coordinates of the first point $P_n$ in the 2D coordinates $(\phi, \lambda)$ system are known beforehand, a first order index difference $\Delta o_{n+1}$ is obtained as a difference between the order index $o(P_{n+1})$ associated with the point $P_{n+1}$ and the order index $o(P_n)$ associated with the point $P_n$. A second order index difference $\Delta o_{n+2}$ is obtained as a difference between the order index $o(P_{n+2})$ associated with another ordered point $P_{n+2}$ and the order index $o(P_{n+1})$ associated with $P_{n+1}$, and so on.

Next, the radius values $r_n$ (essentially representative of either $r_{2D}$ or $r_{3D}$ of the point $P_n$) of spherical coordinates associated with ordered points of the point cloud are encoded in a bitstream.

Residuals $(x_{res,n}, y_{res,n}, z_{res,n})$ of three-dimensional cartesian coordinates of ordered points $P_n$ are encoded in the bitstream. They are obtained from their three-dimensional cartesian coordinates, decoded azimuthal angles $\phi_{n,dec}$ obtained from azimuthal angles $\phi_n$, decoded radius values $r_{n,dec}$ obtained from radius values $r_n$, and sensor indices $\lambda_n$.

Next, residual azimuthal angles $\phi_{res,n}$ associated with ordered points are also encoded in a bitstream:

$$\phi_{res,n} = \phi(P_n) - \phi_{pred,n} = \phi(P_n) - \phi_n * \Delta\phi \quad (6)$$

In a variant, the azimuthal angles $\phi_n$ are quantized by:

$$\phi_n = \text{round}(\phi(P_n)/\Delta\phi)$$

In this case, the set of discrete angles $\phi_i$ ($0 \leq i < I$) is essentially defined by $\phi_i = i * \Delta\phi$ and one obtains $\phi_{i(n)} = \phi_n * \Delta\phi$. The decoded azimuthal angles $\phi_{n,dec}$ is thus obtained by $$\phi_{n,dec} = \phi_{res,n} + \phi_{pred,n} = \phi_{res,n} + \phi_n * \Delta\phi$$

Figure 8:
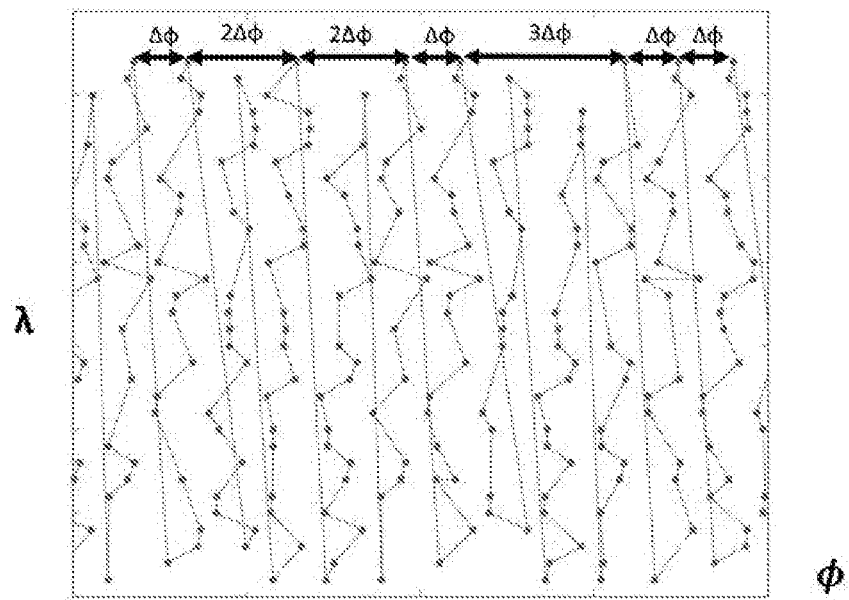
FIG. 8 illustrates an example of captured points in accordance with one exemplary embodiment of the present disclosure.
Figure 9:
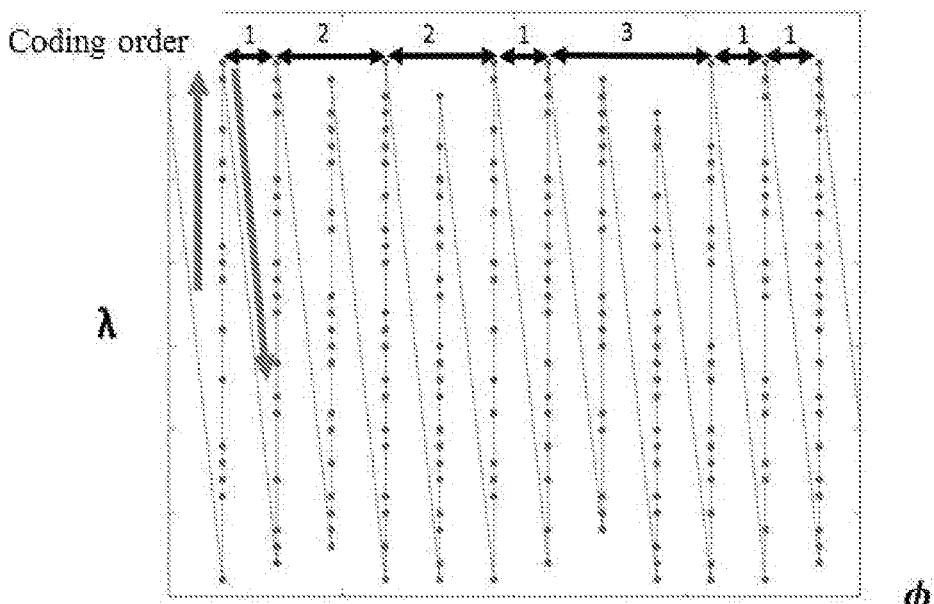
FIG. 9 illustrates an example of ordered and quantized captured points in accordance with one exemplary embodiment of the present disclosure.

This variant provides advantages because sometimes, in practice, not all points are captured at each capture time because a noise may be captured or because sensors may not be all perfectly aligned or because at least one laser beam of a Lidar sensors head may not be reflected. Residual azimuthal angles $\phi_{res,n}$ are meant to encode such noise or misalignment. Captured points may be distributed as depicted on FIG. 8. Quantizing the azimuthal angles $\phi(P_n)$ leads to a discrete representation of points in the 2D coordinates $(\phi, \lambda)$ system as depicted on FIG. 9 that allows an obvious path for ordering the points of the point cloud.

The residual azimuthal angles $\phi_{res,n}$ are encoded into the bitstream B, preferably by quantizing and/or entropy-coding.

This reduces the dynamic of the angular angles to be encoded into the bitstream because only a residual is encoded rather than the full range value. High compression performance is reached.

Decoding points of a point cloud from a bitstream requires information a number N of points of the point cloud, order index $o(P_1)$ of a first point in the 2D coordinates $(\phi, \lambda)$ system, and sensor setup parameters such as the elementary azimuthal shift $\Delta\phi$ or an elevation angle $\theta_k$ associated with each sensor k. This information may be decoded from the bitstream B or received by any other means or may be known beforehand by a decoder.

N points of the point cloud may be decoded recursively.

First, at least one order index difference $\Delta o_n$ (n=2 to N) is decoded from the bitstream. Each order index difference $\Delta o_n$ is decoded for a current point $P_n$.

Next, an order index $o(P_n)$ is obtained for a current point $P_n$ by:

$$o(P_n) = o(P_{n-1}) + \Delta o_n$$

The order index difference $\Delta o_n$ represents a difference between an order index associated with the current point $P_n$ and another order index $o(P_{n-1})$ associated with a previously decoded point $P_{n-1}$.

Next, a sensor index $\lambda_n$ associated with a sensor that captured the current point $P_n$ and an azimuthal angle $\phi_n$ representing a capture angle of said sensor are obtained from the order index $o(P_n)$ by equations (4) and (5).

Next, a decoded azimuthal angle $\phi_{dec,n}$ is given by:

$$\phi_{dec,n} = \phi_{res,n,dec} + \phi_n * \Delta\phi \quad (7)$$

where $\phi_{res,n,dec}$ is a residual azimuthal angle decoded from the bitstream.

Next, a radius value $r_n$ of spherical coordinates of the current points $P_n$ and a residual of three-dimensional cartesian coordinates of the current point $P_n$ are decoded from the bitstream.

Finally, three-dimensional cartesian coordinates (x,y,z) of a current point $P_n$ are decoded based on the decoded residual of the three-dimensional cartesian coordinates of the current point $P_n$, the decoded radius value $r_n$, the decoded azimuthal angle $\phi_{n,dec}$ and the sensor index $\lambda_n$.

As understood from the related art, residuals azimuthal angles $\phi_{res,n}$ (equation 2 or 6) are encoded in a bitstream.

The definition of these residual azimuthal angles leads to the following inequality denoted the bound property:

$$|\phi_{res,n}| \leq \Delta\phi/2 \quad (8)$$

This inequality shows that the residual azimuthal angles are bounded by a value that depends on sensor characteristics, namely the elementary azimuthal shift $\Delta\phi$ between two probing of the spinning sensor head.

The problem to solve is to profit from the bound property (8) in the framework of capturing a point cloud geometry by using a spinning sensor head to improve coding efficiency of such a captured point cloud geometry data.

At least one of the aspects generally relates to point cloud encoding and decoding, and at least one other aspect generally relates to transmitting a bitstream generated or encoded.

Moreover, the present aspects are not limited to MPEG standards such as MPEG-I part 5 or part 9 that relate to the Point Cloud Compression, and may be applied, for example, to other standards and recommendations, whether pre-existing or future-developed, and extensions of any such standards and recommendations (including MPEG-I part 5 and part 9). Unless indicated otherwise, or technically precluded, the aspects described in the present disclosure may be used individually or in combination.

The present disclosure relates to a field of encoding and decoding technology, aims to provide a technical solution of encoding/decoding point cloud data. Since the point cloud is a set of mass data, a large amount of memory may be consumed by storing the point cloud, also it is impossible to transmit the point cloud directly in the network layer without compressing the point cloud, so that it is required to compress the point cloud. Therefore, the present disclosure can be used in many application scenarios, as the point cloud is more and more widely used in autonomous navigation, real-time inspection, geographic information service, culture heritage/buildings protection, 3D immersion communication and interaction, and so on.

The present disclosure particularly relates to enconding/decoding azimuthal angle data based on sensor characteristics, which may improve coding efficiency of the captured point cloud geometry data.

The present disclosure relates to a method 100 of encoding a point cloud into a bitstream of encoded point cloud data representing a physical object. The encoding method 100 comprises encoding, in a bitstream, an azimuthal angle data $\phi_{coded,n}$, representative of an azimuthal angle responsive to a capture angle of a sensor that captured a point $P_n$ of a point cloud. Said encoding is based on a boundary value B that depends on sensor characteristics and such that the absolute value of said azimuthal angle data $\phi_{coded,n}$ is bounded by said boundary value B.

In practice, the azimuthal angle data $\phi_{coded,n}$ is an integer value that is bounded by the boundary value B:

$$|\phi_{coded,n}| \leq B \quad (9)$$

Figure 10:
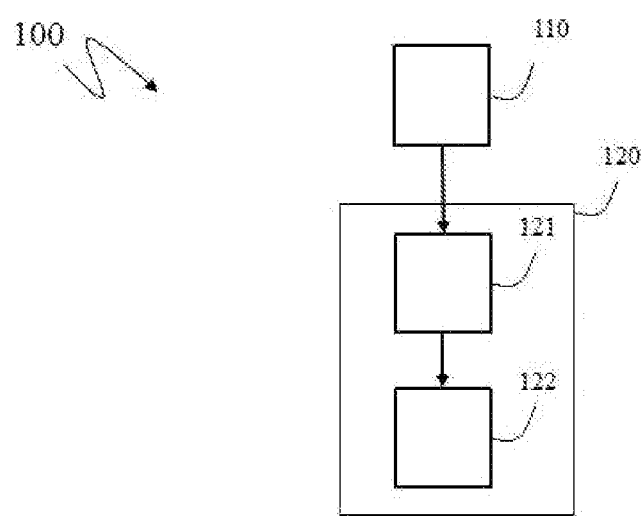
FIG. 10 illustrates a block diagram of steps of a method 100 of encoding a point cloud from a bitstream of encoded point cloud data representing a physical object in accordance with at least one exemplary embodiment.

FIG. 10 illustrates a block diagram of steps of the method 100 in accordance with at least one exemplary embodiment.

The method 100 comprises steps 110 and 120.

In step 110, the azimuthal angle data $\phi_{coded,n}$ representative of an azimuthal angle $\phi(P_n)$ responsive to a capture angle of a sensor of the spinning sensor head 10 that captured a point $P_n$ of the point cloud, is obtained from a point cloud geometry data captured by the spinning sensors head 10.

In a first exemplary embodiment of step 110, the azimuthal angle data $\phi_{coded,n}$ is obtained by quantizing a first order residual azimuthal angle $\phi_{res,n}$ between the azimuthal angle $\phi(P_n)$ and a prediction angle $\phi_{pred,n}$ of said azimuthal angle.

For example, the first order residual azimuthal angle may be the residual azimuthal angle $\phi_{res,n}$ given by equation (2) or (6) and, optionally, a subsequent quantization by a quantizing operator Q(.).

The boundary value B is given by:

$$B = Q(\Delta\phi/2) \quad (10)$$

Any quantizing operator Q(.) may be used using uniform or non-uniform steps and/or a dead-zone.

In a variant, quantizing the first order residual azimuthal angle $\phi_{res,n}$ is given by:

$$\phi_{coded,n} = Q(\phi_{res,n}) = \phi_{res,n,Q} = \text{round}(\phi_{res,n}/d\phi) \quad (11)$$

where $d\phi$ is a quantizing step.

The boundary value B is then deduced from equation (10) as $$B = \text{round}(\Delta\phi/(2*d\phi)) \quad (12)$$

The error e in cartesian coordinates space is then proportional to the 2D radius $r_{2D}$ (i.e. the distance between the sensor and the point $P_n$ of the point cloud) due to the error up to $d\phi/2$ on the reconstructed angle after dequantization.

$$e \approx r_{2D} * d\phi/2.$$

Thus, in terms of compression efficiency, it is somewhat optimal to choose a quantization step $d\phi$ that leads to uniform errors e that is independent on the points' 2D radius. Basically, one may take $$d\phi = dQ/2 * r_{2D}$$

where dQ is a quantizing parameter selected by a user. Typically, dQ is equal to 1 for lossless coding. By doing so, equation (12) becomes $$B = \text{round}(r_{2D} * \Delta\phi/dQ) \quad (13)$$

The boundary value B may then become small for small radii $r_{2D}$. In extreme cases, for very small radii, one may end up with B=0. In such case, the azimuthal angle data $\phi_{coded,n}$ does not need to be coded because it is known from equation (9) that its value is necessarily zero.

In a second exemplary embodiment of step 110, the azimuthal angle data $\phi_{coded,n}$ is obtained by adding an offset value that depends on the boundary value B to an intermediate azimuthal angle data $\phi'_{coded,n}$ that depends on a second order residual azimuthal angle $\phi_{res,n,res}$ between the first order residual azimuthal angle $\phi_{res,n}$ and a prediction $\phi_{res,n,pred}$ of said first order residual azimuthal angle:

$$\phi_{res,n,res} = \phi_{res,n} - \phi_{res,n,pred} \quad (14)$$

In a variant, the prediction $\phi_{res,n,pred}$ of said first order residual azimuthal angle is obtained by quantizing the first order residual azimuthal angle $\phi_{res,al}$ associated with an already coded point $P_{al}$ of the point cloud:

$$\phi_{res,pred,n} = Q(\phi_{res,al})$$

In the one chain coding scheme, the already point $P_{al}$ is a predecessor of the current point $P_n$ in the ordered list of points. In another variant, this predecessor is chosen among predecessors having the same laser index $\lambda$ as the current point $P_n$.

In a variant, the intermediate azimuthal angle data $\phi'_{coded,n}$ is given by quantizing the second order residual azimuthal angle $\phi_{res,n,res}$:

$$\phi'_{coded,n} = Q(\phi_{res,n,res}) = \phi_{res,n,res,Q} = Q(\phi_{res,n} - \phi_{res,n,pred})$$

In another variant, the intermediate azimuthal angle data $\phi'_{coded,n}$ is given by the difference between a quantized first order residual azimuthal angle $\phi_{res,n,Q}$ and the prediction $\phi_{res,n,pred}$ of said first order residual azimuthal angle:

$$\phi'_{coded,n} = \phi_{res,n,Q} - \phi_{res,n,pred} \quad (15)$$

where $\phi_{res,n,pred}$ is a prediction of the quantized first order residual azimuthal angle $\phi_{res,n,Q}$, or a quantized version of a prediction of the first order residual azimuthal angle $\phi_{res,n}$.

The intermediate azimuthal angle data $\phi'_{coded,n}$ is not bounded by B by nature.

The added offset value is the product of an integer value $n_{B,enc}$ by 2B+1 where B is the boundary value. The integer value $n_{B,enc}$ ensures that the absolute value of the azimuthal angle data $\phi_{coded,n}$ is bounded by the boundary value B (equation (9)):

$$\phi_{coded,n} = \phi'_{coded,n} + n_{B,enc} * (2B+1) \quad (16)$$

where B is the boundary value determined by equation (12).

In a variant, the integer $n_{B,enc}$ may be obtained by:

$$n_{B,enc} = -\text{round}(\phi'_{coded,n}/(2B+1)) \quad (17)$$

In another variant, the integer value $n_{B,enc}$ may be obtained by iteratively applying (adding or subtracting) an offset of 2B+1 until the bounded relation of equation (9) is fulfilled.

Figure 11:
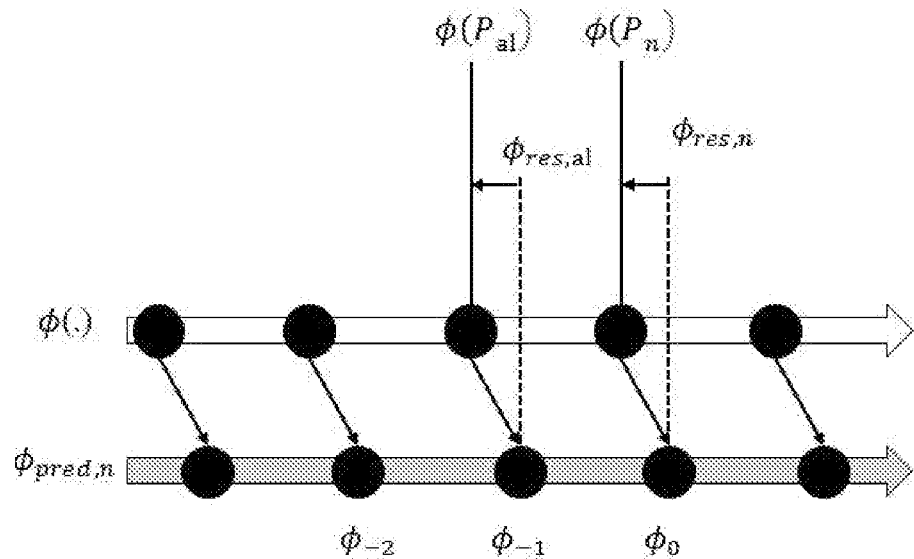
FIG. 11 illustrates advantages of the method 100 in accordance with at least one exemplary embodiment.

The second embodiment of step 110 provides advantages because using a second order residual azimuthal angle $\phi_{res,n,res}$ reduces the amplitude of the azimuthal angle data $\phi_{coded,n}$ as explained below with support of FIG. 11 in the context of the one-chain coding.

Let us consider a current point $P_n$ associated with an azimuthal angle $\phi(P_n)$ and a first order residual azimuthal angle $\phi_{res,n}$ given by equation (6):

$$\phi_{res,n} = \phi(P_n) - \phi_{pred,n} = \phi(P_n) - \phi_0$$

The quantized first order azimuthal residual (equation 11) to be coded is given by $$\phi_{coded,n} = Q(\phi_{res,n}) = \phi_{res,n,Q}$$

Now, let us consider an already coded point $P_{al}$ which is associated with an azimuthal angle $\phi(P_{al})$ and a first order residual azimuthal angle $\phi_{res,al}$ is given by equation (6):

$$\phi_{res,al} = \phi(P_{al}) - \phi_{pred,al} = \phi(P_{al}) - \phi_{-1}$$

Instead of coding the quantized first order azimuthal residual $\phi_{res,n,Q}$, in the second embodiment of step 110, a second order residual azimuthal angle $\phi_{res,n,res}$ between the first order residual azimuthal angle $\phi_{res,n}$ and a prediction $\phi_{res,n,pred}$ of said first order residual azimuthal angle is obtained such that one gets an intermediate azimuthal angle data $\phi'_{coded,n}$ given by equation (15):

$$\phi'_{coded,n} = Q(\phi_{res,n}) - \phi_{res,n,pred} = Q(\phi_{res,n}) - Q(\phi_{res,al}) = Q(\phi(P_n) - \phi_0) - Q(\phi(P_{al}) - \phi_{-1})$$

Thanks to the rotating property of the spinning sensor head 10, one gets the following approximation:

$$\phi(P_{al}) \approx \phi(P_n) - \Delta\phi$$

and then $$\phi(P_{al}) - \phi_{-1} \approx \phi(P_n) - \Delta\phi - \phi_{-1} = \phi(P_n) - \phi_0$$

Consequently, the intermediate azimuthal angle data $\phi'_{coded,n}$ to be coded is very small and efficient compression is obtained.

Bounding the intermediate azimuthal angle data $\phi'_{coded,n}$ (the quantized second order residual azimuthal angle $\phi_{res,n,res,Q}$) by using the integer value $n_{B,enc}$ provides advantages as explained below.

Figure 12:
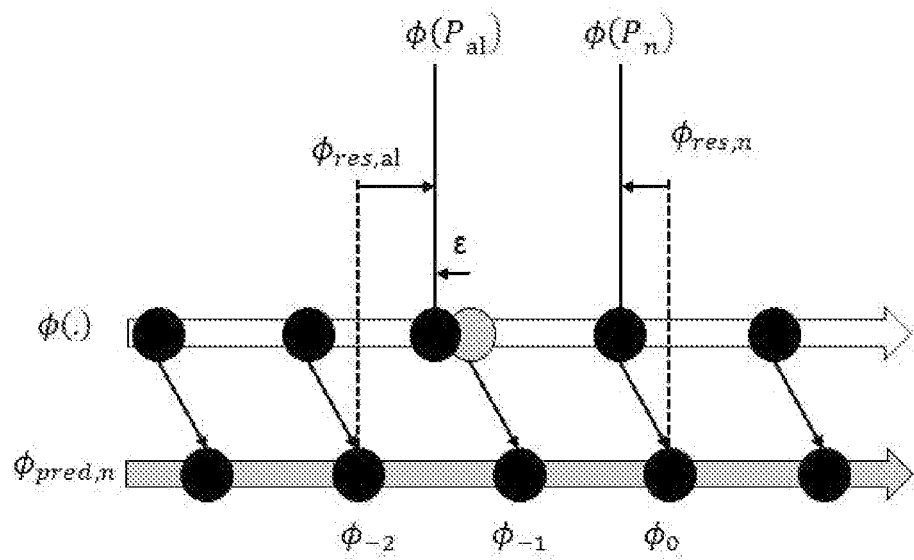
FIG. 12 illustrates advantages of the method 100 in accordance with at least one exemplary embodiment.

Point capture may suffer from sensor noise as depicted in FIG. 12. Compared to FIG. 11, the already coded point $P_{al}$ is slightly moved to the left due to some noise $\epsilon$. As a consequence, the associated predicted angle has changed from $\phi_{-1}$ to $\phi_{-2}$ and the first order residual azimuthal angle $\phi_{res,al}$ is dramatically impacted. Now, the quantized first order residual azimuthal angle $\phi_{res,al}$ is a bad predictor of the first order residual azimuthal angle $\phi_{res,n}$ (equation 15):

$$\phi'_{coded,n} = Q(\phi_{res,n}) - \phi_{res,n,pred} =$$
$$Q(\phi_{res,n}) - Q(\phi_{res,al}) = Q(\phi(P_n) - \phi_0) - Q(\phi(P_{al}) - \phi_{-2})$$

Bounding the intermediate azimuthal angle data $\phi'_{coded,n}$ by using $n_{B,enc}$ actually solves the problem of a bad predictor $Q(\phi_{res,al})$ because the azimuthal angle $\phi(P_{al})$ can be expressed as $$\phi(P_{al}) \approx \phi(P_n) - \Delta\phi - \epsilon$$

and then one obtains:

$$\phi(P_{al}) - \phi_{-2} = \phi(P_n) - \Delta\phi - \epsilon - \phi_{-2} = \phi(P_n) - \phi_0 + \Delta\phi - \epsilon$$

such that, after applying the quantization operator, one gets the approximation:

$$Q(\phi(P_{al}) - \phi_{-2}) \approx Q(\phi(P_n) - \phi_0) + Q(\Delta\phi) + Q(-\epsilon) \approx Q(\phi(P_n) - \phi_0) + Q(\Delta\phi)$$

The unbounded intermediate azimuthal angle data $\phi'_{coded,n}$ can be approximated by $$\phi'_{coded,n} = Q(\phi(P_n) - \phi_0) - Q(\phi(P_{ai}) - \phi_{-2}) \approx -Q(\Delta\phi) \approx -2B$$

that obviously does not fulfill the bound condition of equation (9).

Thus, according to the present disclosure, an offset of a multiple of (2B+1) is applied with factor $n_{B,enc} = +1$ (equation 16) to obtain $$\phi_{coded,n} = \phi'_{coded,n} + (2B+1) \approx 0$$

The azimuthal angle data $\phi_{coded,n}$ is now bounded by the boundary integer value B. The azimuthal angle data $\phi_{coded,n}$ has then small amplitude and can be efficiently compressed using entropy coding based on the boundary value B.

In step 120, the bounded azimuthal angle data $\phi_{coded}$ is encoded in a bitstream by using the boundary value B.

In an exemplary embodiment of step 120, the azimuthal angle data $\phi_{coded,n}$ is binarized (step 121), into a series of binary data $f_i$, and, in step 122, only the binary data $f_i$ for which none of the two possible values violates the condition stating that the absolute value of the data $\phi_{coded,n}$ is bounded by the boundary value B, is encoded.

In an exemplary embodiment of step 121 and 122, binarizing and coding the azimuthal angle data $\phi_{coded,n}$ by a series of binary data $f_i$ comprises:

a binary data $f_0$ is added in the bitstream to signal if $\phi_{coded,n}$ is equal to zero ($f_0=0$) or if $\phi_{coded,n}$ is not equal to zero ($f_0=1$);

in case $\phi_{coded,n}$ is not equal to zero a. a sign flag s is added to the bitstream to signal the sign of $\phi_{coded,n}$;

b. a series of $N_f$ flags $f_1$ to $f_{Nf}$ is added in the bitstream, each flag $f_j$ signaling if $|\phi_{coded,n}|$ is equal to j, until one of these flag is positive:

c. in case all the flags are negative, i.e. if $\phi_{coded,n}$ is greater than $N_f$, then the reminder $|\phi_{coded,n}| - N_f - 1$ is binarized by an expGolomb code into more binary data.

The flag $f_0$ does not need to be coded in case the boundary value B is equal to 0. Similarly, if the data $\phi_{coded,n}$ is equal to the bound $B \leq N_f$, then the flag $f_B$, signaling if $|\phi_{coded,n}|$ is equal to B, does not need to be coded because it can be inferred to be positive ($f_B=1$) by the decoder; because otherwise $f_B=0$ would signify that $|\phi_{coded,n}|$ is at least B+1, in contradiction with the bound property of equation (9).

In a similar manner, a binary data constituting the expGolomb code may not need to be coded if one of its potential value (0 or 1) would contradict the bound property of equation (9); the binary data can then be inferred by the decoder to the opposite value.

It is understood that the coded flags or expGolomb code may rely on arithmetic coding, like context Adaptive Binary Arithmetic Coder (CABAC) or other entropy coder for better compression.

In some variants, other binarization methods or decomposition of $\phi_{coded,n}$ could be used as well, by following the same principle of not coding unnecessary data, taking into account the boundary value B. For instance, the series of flags $f_1$ to $f_{Nf}$ could be omitted (i.e. $N_f = 0$ would be used), and/or the expGolomb code could be replaced by another variable length coding representation, like a Golomb-Rice or a Huffman code.

As exemplified above, in step 122, only the binary data $f_i$ for which none of the two possible values violates the condition stating that the absolute value of the data $\phi_{coded,n}$ is bounded by the boundary value B, are encoded. A binary data $f_i$ for which one of the possible values violates the bound condition (9) does not to be encoded as it can be inferred (by the decoder) to the unique value that does not violate the condition. By not coding such binary data, the bitstream size is reduced, thus leading to better compression of the point cloud.

The present disclosure also relates to a method 200 of decoding a point cloud, from a bitstream of encoded point cloud data representing a physical object. The method 200 comprises decoding, from a bitstream, azimuthal angle data $\phi_{coded,n}$ representative of an azimuthal angle responsive to a capture angle of a sensor that captured a point of the point cloud. Said decoding is based on a boundary value B that depends on sensor characteristics and such that the absolute value of said azimuthal angle data $\phi_{coded,n}$ is bounded by said boundary value B (equation (9)).

Figure 13:
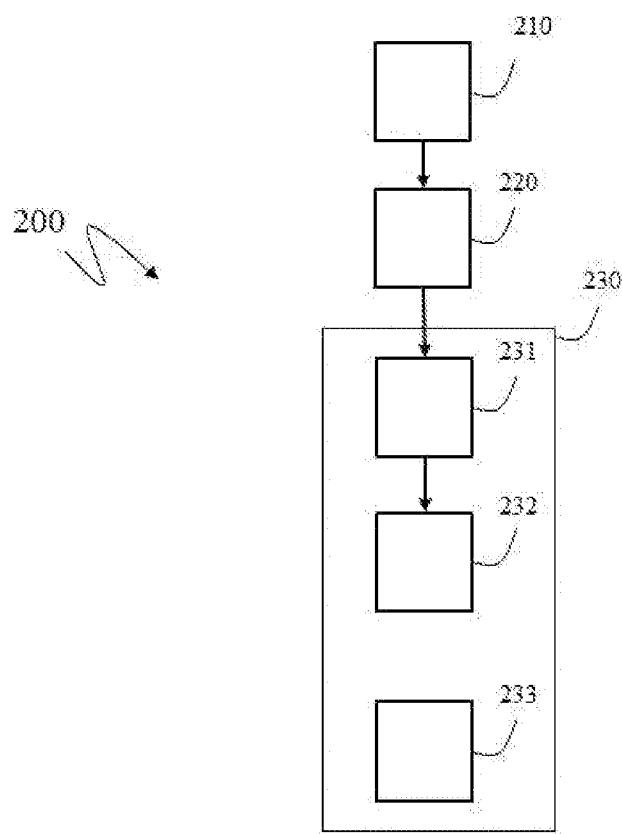
FIG. 13 illustrates a block diagram of steps of a method 200 of decoding a point cloud from a bitstream of encoded point cloud data representing a physical object in accordance with at least one exemplary embodiment.

FIG. 13 illustrates a block diagram of steps of the method 200 in accordance with at least one exemplary embodiment.

The method 200 comprises steps 210, 220 and 230.

In step 210, the boundary value B is obtained, using the same method as the encoder, by equation (10), (12) or (13).

In step 220, the azimuthal angle data $\phi_{coded,n}$ is decoded. The decoding of the azimuthal angle data $\phi_{coded,n}$ is performed by obtaining the values of a series of binary data $f_i$. The decoded value of the azimuthal angle data $\phi_{coded,n}$ is then computed form the values of the binary data $f_i$. The value of each binary data $f_i$ is either decoded from the bitstream or inferred. In case one of the two possible values of the binary data $f_i$ violates the bound condition (9), the value is inferred to the other value that does not violate the condition. If none of the two possible values violates the bound condition (9), the value is decoded from the bitstream.

For example, let us consider a first binary data $f_0$ that indicates whether ($f_0=1$) or not ($f_0=0$) the azimuthal angle data $\phi_{coded,n}$ is equal to zero. If the bound B is zero, then $f_0$ is inferred to 1. Otherwise, $f_0$ is decoded.

Now let us suppose that B>0 and $f_0$ has been decoded to 0, i.e. the azimuthal angle data $\phi_{coded,n}$ is not equal to zero. Then a bit signaling the sign of the azimuthal angle data $\phi_{coded,n}$ is decoded. Next, the value of a binary data $f_1$ that indicates whether ($f_1=1$) or not ($f_1=0$) the absolute value $|\phi_{coded,n}|$ is equal to one is obtained. In case B=1, then $f_1$ is inferred to 1; otherwise in case B>1, then $f_1$ is decoded. The same process applies to the series of binary data $f_i$, each of them signaling whether ($f_i=1$) or not ($f_i=0$) the absolute value $|\phi_{coded,n}|$ is equal to i. In case B=i, then the value of $f_i$ is inferred to 1.

Step 220 is not limited to the coding of the azimuthal angle data $\phi_{coded,n}$ by a series of binary data. Alternatively, the azimuthal angle data $\phi_{coded,n}$ may be coded using a non-binary word W. The bound condition (9) implies that the azimuthal angle data $\phi_{coded,n}$ can take 2B+1 different values in the range from −B to B. Consequently, the azimuthal angle data $\phi_{coded,n}$ can be represented by a word W of length $L_W$ defined by $$L_W = \text{ceil}(\log 2(2B+1)).$$

The word W may be then part of the bitstream, coded by any known means like simply pushing bits or entropy coded. The knowledge of the bound B allows the decoding method 200 to decode, at step 220, the word W of length $L_W$ that depends on B. The azimuthal angle data $\phi_{coded,n}$ is then recovered based on the decoded word W.

In another embodiment of step 220, the azimuthal angle data $\phi_{coded,n}$ may be coded using both a series of binary data $f_i$ and a non-binary word W whose length $L_W$ depends on the bound B. For example, a first part of the azimuthal angle data $\phi_{coded,n}$ may be coded using binary data $f_i$ and the remaining may be coded using a non-binary word W.

In step 230, the decoded azimuthal angle $\phi_{dec,n}$ associated with the point $P_n$ is decoded.

In a first embodiment of step 230, the azimuthal angle data $\phi_{coded,n}$ is a quantized first order residual azimuthal angle $\phi_{res,n,Q}$ (equation 11) between the azimuthal angle $\phi(P_n)$ and a prediction angle $\phi_{pred,n}$ of said azimuthal angle.

The azimuthal angle ($\phi_{dec,n}$) associated with a point $P_n$ of the point cloud is then decoded from the azimuthal angle data $\phi_{coded,n}$ and the prediction angle $\phi_{pred,n}$ as in equation (3) or (7):

$$\phi_{dec,n}=\phi_{coded,n}+\phi_{pred,n}$$

The boundary value B may then become small for small radii $r_{2D}$. In extreme cases, for very small radii, one may end up with B=0. In such case, the azimuthal angle data $\phi_{coded,n}$ does not need to be decoded and is inferred to zero because it is known from equation (9) that its value is necessarily zero.

In a second embodiment of step 230, the boundary value B is given by equation (10). An intermediate residual azimuthal angle $\phi_{res,n,Q}$ is obtained (step 231) from the azimuthal angle data $\phi_{coded,n}$ and a prediction $\phi_{res,n,pred}$ by $$\phi_{res,n,Q}=\phi_{coded,n}+\phi_{res,n,pred}$$

where $\phi_{res,n,pred}$ is a prediction of the first order residual azimuthal angle $\phi_{res,n}$ between the azimuthal angle $\phi(P_n)$ and a prediction angle $\phi_{pred,n}$ of said azimuthal angle.

In a variant, the prediction $\phi_{res,n,pred}$ of said first order residual azimuthal angle is obtained by quantizing the first order residual azimuthal angle $\phi_{res,al}$ associated with an already decoded point $P_{al}$ of the point cloud:

$$\phi_{res,n,pred}=Q(\phi_{res,al})$$

In step 232, a first order residual azimuthal angle $\phi_{res,n,Q,dec}$ is obtained by adding an offset value that depends on the boundary value B to the intermediate residual azimuthal angle $\phi_{res,n,Q}$:

$$\phi_{res,n,Q,dec}=\phi_{res,n,Q}+n_{B,dec}*(2B+1)$$

where $n_{B,dec}$ is an integer value that ensures that the first order residual azimuthal angle $\phi_{res,n,Q,dec}$ is bounded by the boundary value B (equation (9)):

$$|\phi_{res,n,Q,dec}|\leq B \quad (18)$$

In a variant, the integer value $n_{B,dec}$ can be obtained in a similar way as $n_{B,enc}$ during the encoding:

$$N_{B,dec}=-\text{round}(\phi_{res,n,Q}/(2B+1))$$

In another variant, the integer value $n_{B,dec}$ may be obtained by iteratively applying (adding or subtracting) an offset of 2B+1 until the bounded relation of equation (18) is fulfilled.

Thus, the first order residual azimuthal angle $\phi_{res,n,Q,dec}$ corresponds exactly to first order residual azimuthal angle $\phi_{res,n,Q}$ of the encoder as proved below.

$$-n_{B,dec}*(2B+1)=\phi_{res,n,Q}-\phi_{res,n,Q,dec}=\phi_{coded}+\phi_{res,n,pred}-\phi_{res,n,Q,dec}=$$
$$\phi'_{coded}+n_{B,enc}*(2B+1)+\phi_{res,n,pred}-\phi_{res,n,Q,dec}=$$
$$\phi_{res,n,Q}-\phi_{res,n,pred}+n_{B,enc}*(2B+1)+\phi_{res,n,pred}-\phi_{res,n,Q,dec}=$$
$$n_{B,enc}*(2B+1)+\phi_{res,n,Q}-\phi_{res,n,Q,dec}$$

Then, dividing by (2B+1) and taking the absolute value, one gets $$|n_{B,enc}+n_{B,dec}|=|\phi_{res,n,Q,dec}/(2B+1)-\phi_{res,n,Q}/(2B+1)|$$

$$\leq \phi_{res,n,Q}/(2B+1)|+|\phi_{res,n,Q,dec}/(2B+1)|\leq B/(2B+1)+B/(2B+1)<1$$

Now, because $|n_{B,enc}+N_{B,dec}|$ is a positive integer strictly smaller than 1, one gets necessarily $n_{B,dec}=-n_{B,enc}$. This proves that $\phi_{res,n,Q}=\phi_{res,n,Q,dec}$ because of $\phi_{res,n,Q}-\phi_{res,n,Q,dec}=-n_{B,dec}*(2B+1)-n_{B,enc}*(2B+1)=-(n_{B,dec}+N_{B,enc})*(2B+1)=0$.

Consequently, the first order residual azimuthal angle $\phi_{res,n,Q,dec}$ of the decoder corresponds exactly to the first order residual azimuthal angle $\phi_{res,n,Q}$ of the encoder. In other words, adding a multiple of 2B+1 during the decoding method did not jeopardize the ability of the decoder to recover the adequate value for the first order residual azimuthal angle.

In step 233, a decoded first order residual azimuthal angle $\phi_{res,n,dec}$ is obtained by inverse quantizing the first order residual azimuthal angle $\phi_{res,n,Q,dec}$.

The decoded azimuthal angle $\phi_{dec,n}$ associated with the point $P_n$ is obtained from the decoded first order residual azimuthal angle $\phi_{res,n,dec}$ and a prediction angle $\phi_{pred,n}$ of the azimuthal angle $\phi(P_n)$ as in equation (3) or (7):

$$\phi_{dec,n}=\phi_{res,n,dec}+\phi_{pred,n}$$

The present encoding/decoding method can be used to encode/decode the point cloud which may be used for various purposes, especially used to encode/decode azimuthal angle data based on a boundary value that depends on sensor characteristics, which may improve the coding efficiency.

Figure 14:
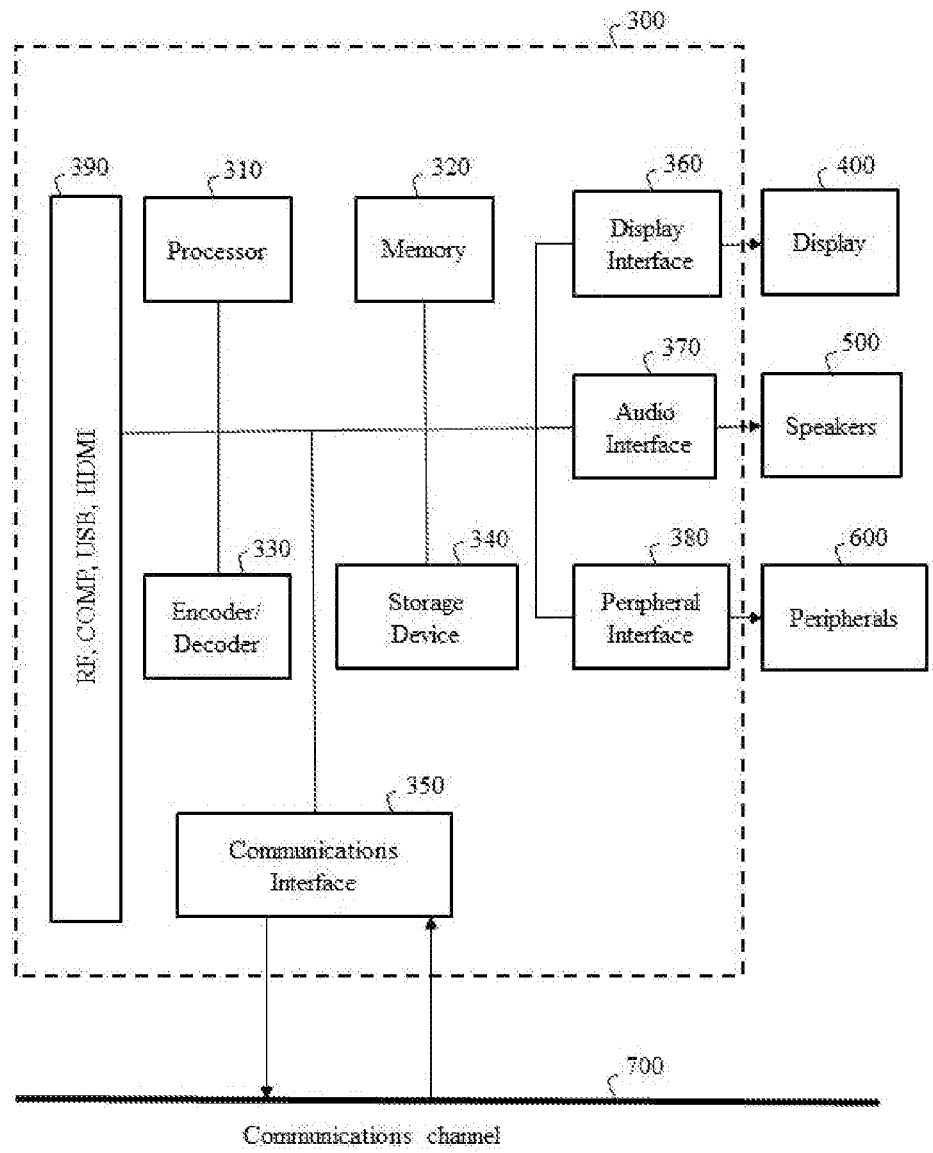
FIG. 14 illustrates a schematic block diagram of an example of a system in which various aspects and exemplary embodiments are implemented.

FIG. 14 shows a schematic block diagram illustrating an example of a system in which various aspects and exemplary embodiments are implemented.

System 300 may be embedded as one or more devices including the various components described below. In various embodiments, the system 300 may be configured to implement one or more of the aspects described in the present disclosure.

Examples of equipment that may form all or part of the system 300 include personal computers, laptops, smartphones, tablet computers, digital multimedia set top boxes, digital television receivers, personal video recording systems, connected home appliances, connected vehicles and their associated processing systems, head mounted display devices (HMD, see-through glasses), projectors (beamers), "caves" (system including multiple displays), servers, video encoders, video decoders, post-processors processing output from a video decoder, pre-processors providing input to a video encoder, web servers, set-top boxes, and any other device for processing a point cloud, a video or an image or other communication devices. Elements of system 300, singly or in combination, may be embodied in a single integrated circuit (IC), multiple ICs, and/or discrete components. For example, in at least one embodiment, the processing and encoder/decoder elements of system 300 may be distributed across multiple ICs and/or discrete components. In various embodiments, the system 300 may be communicatively coupled to other similar systems, or to other electronic devices, via, for example, a communications bus or through dedicated input and/or output ports.

The system 300 may include at least one processor 310 configured to execute instructions loaded therein for implementing, for example, the various aspects described in the present disclosure. Processor 310 may include embedded memory, input output interface, and various other circuitries as known in the art. The system 300 may include at least one memory 320 (for example a volatile memory device and/or a non-volatile memory device). System 300 may include a storage device 340, which may include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random-Access Memory (DRAM), Static Random-Access Memory (SRAM), flash, magnetic disk drive, and/or optical disk drive. The storage device 340 may include an internal storage device, an attached storage device, and/or a network accessible storage device, as non-limiting examples.

The system 300 may include an encoder/decoder module 330 configured, for example, to process data to provide encoded/decoded point cloud geometry data, and the encoder/decoder module 330 may include its own processor and memory. The encoder/decoder module 330 may represent module(s) that may be included in a device to perform the encoding and/or decoding functions. As is known, a device may include one or both of the encoding and decoding modules. Additionally, encoder/decoder module 330 may be implemented as a separate element of system 300 or may be incorporated within processor 310 as a combination of hardware and software as known to those skilled in the art.

Program code to be loaded onto processor 310 or encoder/decoder 330 to perform the various aspects described in the present disclosure may be stored in storage device 340 and subsequently loaded onto memory 320 for execution by processor 310. In accordance with various embodiments, one or more of processor 310, memory 320, storage device 340, and encoder/decoder module 330 may store one or more of various items during the performance of the processes described in the present disclosure. Such stored items may include, but are not limited to, a point cloud frame, encoded/decoded geometry/attributes videos/images or portions of the encoded/decoded geometry/attribute video/images, a bitstream, matrices, variables, and intermediate or final results from the processing of equations, formulas, operations, and operational logic.

In several embodiments, memory inside of the processor 310 and/or the encoder/decoder module 330 may be used to store instructions and to provide working memory for processing that may be performed during encoding or decoding.

In other embodiments, however, a memory external to the processing device (for example, the processing device may be either the processor 310 or the encoder/decoder module 330) may be used for one or more of these functions. The external memory may be the memory 320 and/or the storage device 340, for example, a dynamic volatile memory and/or a non-volatile flash memory. In several embodiments, an external non-volatile flash memory may be used to store the operating system of a television. In at least one embodiment, a fast external dynamic volatile memory such as a RAM may be used as working memory for video coding and decoding operations, such as for MPEG-2 part 2 (also known as ITU-T Recommendation H.262 and ISO/IEC 13818-2, also known as MPEG-2 Video), HEVC (High Efficiency Video coding), VVC (Versatile Video Coding), or MPEG-I part 5 or part 9.

The input to the elements of system 300 may be provided through various input devices as indicated in block 390. Such input devices include, but are not limited to, (i) an RF portion that may receive an RF signal transmitted, for example, over the air by a broadcaster, (ii) a Composite input terminal, (iii) a USB input terminal, and/or (iv) an HDMI input terminal.

In various embodiments, the input devices of block 390 may have associated respective input processing elements as known in the art. For example, the RF portion may be associated with elements necessary for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which may be referred to as a channel in certain embodiments, (iv) demodulating the down-converted and band-limited signal, (v) performing error correction, and (vi) demultiplexing to select the desired stream of data packets. The RF portion of various embodiments may include one or more elements to perform these functions, for example, frequency selectors, signal selectors, band-limiters, channel selectors, filters, downconverters, demodulators, error correctors, and de-multiplexers. The RF portion may include a tuner that performs various of these functions, including, for example, down-converting the received signal to a lower frequency (for example, an intermediate frequency or a near-baseband frequency) or to baseband.

In one set-top box embodiment, the RF portion and its associated input processing element may receive an RF signal transmitted over a wired (for example, cable) medium. Then, the RF portion may perform frequency selection by filtering, down-converting, and filtering again to a desired frequency band.

Various embodiments rearrange the order of the above-described (and other) elements, remove some of these elements, and/or add other elements performing similar or different functions.

Adding elements may include inserting elements in between existing elements, such as, for example, inserting amplifiers and an analog-to-digital converter. In various embodiments, the RF portion may include an antenna.

Additionally, the USB and/or HDMI terminals may include respective interface processors for connecting system 300 to other electronic devices across USB and/or HDMI connections. It is to be understood that various aspects of input processing, for example, Reed-Solomon error correction, may be implemented, for example, within a separate input processing IC or within processor 310 as necessary. Similarly, aspects of USB or HDMI interface processing may be implemented within separate interface ICs or within processor 310 as necessary. The demodulated, error corrected, and demultiplexed stream may be provided to various processing elements, including, for example, processor 310, and encoder/decoder 330 operating in combination with the memory and storage elements to process the data stream as necessary for presentation on an output device.

Various elements of system 300 may be provided within an integrated housing. Within the integrated housing, the various elements may be interconnected and transmit data therebetween using suitable connection arrangement 390, for example, an internal bus as known in the art, including the I2C bus, wiring, and printed circuit boards.

The system 300 may include communication interface 350 that enables communication with other devices via communication channel 700. The communication interface 350 may include, but is not limited to, a transceiver configured to transmit and to receive data over communication channel 700. The communication interface 350 may include, but is not limited to, a modem or network card and the communication channel 700 may be implemented, for example, within a wired and/or a wireless medium.

Data may be streamed to the system 300, in various embodiments, using a Wi-Fi network such as IEEE 802.11. The Wi-Fi signal of these embodiments may be received over the communications channel 700 and the communications interface 350 which are adapted for Wi-Fi communications. The communications channel 700 of these embodiments may be typically connected to an access point or router that provides access to outside networks including the Internet for allowing streaming applications and other over-the-top communications.

Other embodiments may provide streamed data to the system 300 using a set-top box that delivers the data over the HDMI connection of the input block 390.

Still other embodiments may provide streamed data to the system 300 using the RF connection of the input block 390.

The streamed data may be used as a way for signaling information used by the system 300. The signaling information may comprise a bitstream of encoded point cloud data representing a physical object and/or information such a number of points of a point cloud and/or sensor setup parameters such as an elementary azimuthal shift $\Delta\phi$ and/or the boundary value B and/or the azimuthal angle data $\phi_{coded,n}$.

It is to be appreciated that signaling may be accomplished in a variety of ways. For example, one or more syntax elements, flags, and so forth may be used to signal information to a corresponding decoder in various embodiments.

The system 300 may provide an output signal to various output devices, including a display 400, speakers 500, and other peripheral devices 600. The other peripheral devices 600 may include, in various examples of embodiments, one or more of a stand-alone DVR, a disk player, a stereo system, a lighting system, and other devices that provide a function based on the output of the system 300.

In various embodiments, control signals may be communicated between the system 300 and the display 400, speakers 500, or other peripheral devices 600 using signaling such as AV.Link (Audio/Video Link), CEC (Consumer Electronics Control), or other communications protocols that enable device-to-device control with or without user intervention.

The output devices may be communicatively coupled to system 300 via dedicated connections through respective interfaces 360, 370, and 380.

Alternatively, the output devices may be connected to system 300 using the communications channel 700 via the communications interface 350. The display 400 and speakers 500 may be integrated in a single unit with the other components of system 300 in an electronic device such as, for example, a television.

In various embodiments, the display interface 360 may include a display driver, such as, for example, a timing controller (T Con) chip.

The display 400 and speaker 500 may alternatively be separate from one or more of the other components, for example, if the RF portion of input 390 is part of a separate set-top box. In various embodiments in which the display 400 and speakers 500 may be external components, the output signal may be provided via dedicated output connections, including, for example, HDMI ports, USB ports, or COMP outputs.

In FIGS. 1-14, various methods are described herein, and each of the methods includes one or more steps or actions for achieving the described method. Unless a specific order of steps or actions is required for proper operation of the method, the order and/or use of specific steps and/or actions may be modified or combined.

Some examples are described with regard to block diagrams and/or operational flowcharts. Each block represents a circuit element, module, or portion of code which includes one or more executable instructions for implementing the specified logical function(s). It should also be noted that in other implementations, the function(s) noted in the blocks may occur out of the indicated order. For example, two blocks shown in succession may, in fact, be executed substantially concurrently or the blocks may sometimes be executed in the reverse order, depending on the functionality involved.

The implementations and aspects described herein may be implemented in, for example, a method or a process, an apparatus, a computer program, a data stream, a bitstream, or a signal. Even if only discussed in the context of a single form of implementation (for example, discussed only as a method), the implementation of features discussed may also be implemented in other forms (for example, an apparatus or computer program).

The methods may be implemented in, for example, a processor, which refers to processing devices in general, including, for example, a computer, a microprocessor, an integrated circuit, or a programmable logic device. Processors also include communication devices.

Additionally, the methods may be implemented by instructions being performed by a processor, and such instructions (and/or data values produced by an implementation) may be stored on a computer readable storage medium. A computer readable storage medium may take the form of a computer readable program product embodied in one or more computer readable medium(s) and having computer readable program code embodied thereon that is executable by a computer. A computer readable storage medium as used herein may be considered a non-transitory storage medium given the inherent capability to store the information therein as well as the inherent capability to provide retrieval of the information therefrom. A computer readable storage medium may be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present embodiments may be applied, is merely an illustrative and not an exhaustive listing as is readily appreciated by one of ordinary skill in the art: a portable computer diskette: a hard disk: a read-only memory (ROM): an erasable programmable read-only memory (EPROM or Flash memory): a portable compact disc read-only memory (CD-ROM): an optical storage device: a magnetic storage device: or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

An apparatus may be implemented in, for example, appropriate hardware, software, and firmware. Examples of such apparatus include personal computers, laptops, smartphones, tablet computers, digital multimedia set top boxes, digital television receivers, personal video recording systems, connected home appliances, head mounted display devices (HMD, see-through glasses), projectors (beamers), "caves" (system including multiple displays), servers, video encoders, video decoders, post-processors processing output from a video decoder, pre-processors providing input to a video encoder, web servers, set-top boxes, and any other device for processing a point cloud, a video or an image or other communication devices. As should be clear, the equipment may be mobile and even installed in a mobile vehicle.

Computer software may be implemented by the processor 310 or by hardware, or by a combination of hardware and software. As a non-limiting example, the embodiments may be also implemented by one or more integrated circuits. The memory 320 may be of any type appropriate to the technical environment and may be implemented using any appropriate data storage technology, such as optical memory devices, magnetic memory devices, semiconductor-based memory devices, fixed memory, and removable memory, as non-limiting examples. The processor 310 may be of any type appropriate to the technical environment, and may encompass one or more of microprocessors, general purpose computers, special purpose computers, and processors based on a multi-core architecture, as non-limiting examples.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The terminology used herein is for the purpose of describing particular embodiments only and is not intended to be limiting. As used herein, the singular forms "a", "an", and "the" may be intended to include the plural forms as well, unless the context clearly indicates otherwise. It will be further understood that the terms "includes/comprises" and/or "including/comprising" when used in this specification, may specify the presence of stated, for example, features, integers, steps, operations, elements, and/or components but do not preclude the presence or addition of one or more other features, integers, steps, operations, elements, components, and/or groups thereof. Moreover, when an element is referred to as being "responsive" or "connected" to another element, it may be directly responsive or connected to the other element, or intervening elements may be present. In contrast, when an element is referred to as being "directly responsive" or "directly connected" to other element, there are no intervening elements present.

It is to be appreciated that the use of any of the symbol/term "/", "and/or", and "at least one of", for example, in the cases of "A/B", "A and/or B" and "at least one of A and B", may be intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Various numeric values may be used in the present disclosure. The specific values may be for example purposes and the aspects described are not limited to these specific values.

It will be understood that, although the terms first, second, etc. may be used herein to describe various elements, these elements are not limited by these terms. These terms are only used to distinguish one element from another. For example, a first element could be termed a second element, and, similarly, a second element could be termed a first element without departing from the teachings of this application. No ordering is implied between a first element and a second element.

Reference to "one exemplary embodiment" or "an exemplary embodiment" or "one implementation" or "an implementation", as well as other variations thereof, is frequently used to convey that a particular feature, structure, characteristic, and so forth (described in connection with the embodiment/implementation) is included in at least one embodiment/implementation. Thus, the appearances of the phrase "in one exemplary embodiment" or "in an exemplary embodiment" or "in one implementation" or "in an implementation", as well any other variations, appearing in various places throughout this application are not necessarily all referring to the same embodiment.

Similarly, reference herein to "in accordance with an exemplary embodiment/example/implementation" or "in an exemplary embodiment/example/implementation", as well as other variations thereof, is frequently used to convey that a particular feature, structure, or characteristic (described in connection with the exemplary embodiment/example/implementation) may be included in at least one exemplary embodiment/example/implementation. Thus, the appearances of the expression "in accordance with an exemplary embodiment/example/implementation" or "in an exemplary embodiment/example/implementation" in various places in the specification are not necessarily all referring to the same exemplary embodiment/example/implementation, nor are separate or alternative exemplary embodiment/examples/implementation necessarily mutually exclusive of other exemplary embodiments/examples/implementation.

Reference numerals appearing in the claims are by way of illustration only and shall have no limiting effect on the scope of the claims. Although not explicitly described, the present embodiments/examples and variants may be employed in any combination or sub-combination.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Although some of the diagrams include arrows on communication paths to show a primary direction of communication, it is to be understood that communication may occur in the opposite direction to the depicted arrows.

Various implementations involve decoding. "Decoding", as used in this application, may encompass all or part of the processes performed, for example, on a received point cloud frame (including possibly a received bitstream which encodes one or more point cloud frames) in order to produce a final output suitable for display or for further processing in the reconstructed point cloud domain. In various embodiments, such processes include one or more of the processes typically performed by a decoder. In various embodiments, such processes also, or alternatively, include processes performed by a decoder of various implementations described in this application, for example, As further examples, in one embodiment "decoding" may refer only to de-quantizing, in one embodiment "decoding" may refer to entropy decoding, in another embodiment "decoding" may refer only to differential decoding, and in another embodiment "decoding" may refer to combinations of de-quantizing, entropy decoding and differential decoding. Whether the phrase "decoding process" may be intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application may encompass all or part of the processes performed, for example, on an input point cloud frame in order to produce an encoded bitstream. In various embodiments, such processes include one or more of the processes typically performed by an encoder. In various embodiments, such processes also, or alternatively, include processes performed by an encoder of various implementations described in this application.

As further examples, in one embodiment "encoding" may refer only to quantizing, in one embodiment "encoding" may refer only to entropy encoding, in another embodiment "encoding" may refer only to differential encoding, and in another embodiment "encoding" may refer to combinations of quantizing, differential encoding and entropy encoding. Whether the phrase "encoding process" may be intended to refer specifically to a subset of operations or generally to the broader encoding process will be clear based on the context of the specific descriptions and is believed to be well understood by those skilled in the art.

Additionally, this application may refer to "determining" various pieces of information. Determining the information may include one or more of, for example, estimating the information, calculating the information, predicting the information, or retrieving the information from memory.

Further, this application may refer to "accessing" various pieces of information. Accessing the information may include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

Also, as used herein, the word "signal" refers to, among other things, indicating something to a corresponding decoder. For example, in certain embodiments the encoder signals a particular information such a number of points of a point cloud and/or sensor setup parameters such as an elementary azimuthal shift $\Delta\phi$ and/or the boundary value B and/or the azimuthal angle data coded,n. In this way, in an embodiment the same parameter may be used at both the encoder side and the decoder side. Thus, for example, an encoder may transmit (explicit signaling) a particular parameter to the decoder so that the decoder may use the same particular parameter. Conversely, if the decoder already has the particular parameter as well as others, then signaling may be used without transmitting (implicit signaling) to simply allow the decoder to know and select the particular parameter. By avoiding transmission of any actual functions, a bit savings is realized in various embodiments. It is to be appreciated that signaling may be accomplished in a variety of ways. For example, one or more syntax elements, flags, and so forth are used to signal information to a corresponding decoder in various embodiments. While the preceding relates to the verb form of the word "signal", the word "signal" may also be used herein as a noun.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method of encoding a point cloud into a bitstream of encoded point cloud data representing a physical object, comprising:
encoding, into the bitstream, azimuthal angle data ($\phi_{coded,n}$) representative of an azimuthal angle ($\phi(P_n)$) responsive to a capture angle of a sensor that captured a point of the point cloud, wherein the encoding is based on a boundary value (B) that depends on sensor characteristics, and an absolute value of the azimuthal angle data ($\phi_{coded}$) is bounded by the boundary value;
wherein encoding the azimuthal angle data ($\phi_{coded}$) further comprises:
binarizing the azimuthal angle data ($\phi_{coded,n}$) into a series of binary data (fi); and
encoding only the binary data ($f_i$) for which neither of the two possible values violates a condition that the absolute value of the azimuthal angle data ($\phi_{coded,n}$) is bounded by the boundary value B.

2. The method of claim 1, wherein the azimuthal angle data ($\phi_{coded}$) is obtained by quantizing a first order residual azimuthal angle ($\phi_{res,n}$) between the azimuthal angle ($\phi(P_n)$) and a prediction angle ($\phi_{pred,n}$) of the azimuthal angle.

3. The method of claim 1, wherein the azimuthal angle data ($\phi_{coded}$) is obtained by adding an offset value that depends on the boundary value (B) to an intermediate azimuthal angle data ($\phi'_{coded}$) that depends on a second order residual azimuthal angle ($\phi_{res,n,res}$) between the first order residual azimuthal angle ($\phi_{res,n}$) and a prediction ($\phi_{res,n,pred}$) of the first order residual azimuthal angle.

4. The method of claim 3, wherein the offset value is the product of an integer value ($n_{B,enc}$) by 2B+1, where B is the boundary value, the integer value ($n_{B,enc}$) ensuring the absolute value of the azimuthal angle data ($\phi_{coded,n}$) is bounded by the boundary value B.

5. The method of claim 1, wherein the boundary value (B) depends on an elementary azimuthal angle shift and a quantizing parameter used for quantizing the first order residual azimuthal angle ($\phi_{res,n}$).

6. A non-transitory storage medium carrying instructions of program code for executing the method of claim 1.

7. A method of decoding a point cloud, from a bitstream of encoded point cloud data representing a physical object, comprising:
  decoding, from the bitstream, azimuthal angle data ($\phi_{coded,n}$) representative of an azimuthal angle ($\phi(P_n)$) responsive to a capture angle of a sensor that captured a point of the point cloud, wherein the decoding is based on a boundary value (B) that depends on sensor characteristics, and an absolute value of the azimuthal angle data ($\phi_{coded,n}$) is bounded by the boundary value (B);
  wherein decoding the azimuthal angle data ($\phi_{coded,n}$) comprises obtaining a series of binary data ($f_i$) representative of the azimuthal angle data ($\phi_{coded,n}$) by, for each binary data ($f_i$):
  decoding the binary data ($f_i$) from the bitstream in case neither of the two possible values violates a condition that the absolute value of the azimuthal angle data ($\phi_{coded,n}$) is bounded by the boundary value B.

8. The method of claim 7, wherein the azimuthal angle data ($\phi_{coded,n}$) is a quantized residual azimuthal angle ($\phi_{res,n,Q}$) between the azimuthal angle ($\phi(P_n)$) and a prediction angle ($\phi_{pred,n}$) of the azimuthal angle.

9. The method of claim 7, further comprising:
  obtaining an intermediate residual azimuthal angle ($\phi_{res,n,Q}$) from the azimuthal angle data ($\phi_{coded}$) and a prediction ($\phi_{res,n,pred}$) of a first residual azimuthal angle between the azimuthal angle ($\phi(P_n)$) and a prediction angle ($\phi_{pred,n}$) of the azimuthal angle;
  obtaining a first order residual azimuthal angle ($\phi_{res,n,Q,dec}$) by adding an offset value that depends on the boundary value (B) to the intermediate residual azimuthal angle ($\phi_{res,n,Q}$); and
  inverse quantizing the first order residual azimuthal angle ($\phi_{res,n,Q,dec}$).

10. The method of claim 9, wherein the offset value is the product of an integer value ($n_{B,dec}$) by 2B+1, where B is the boundary value, the integer value ($n_{B,dec}$) ensuring that the absolute value of the intermediate residual azimuthal angle ($\phi_{res,n,Q}$) is bounded by the boundary value B.

11. The method of claim 7, wherein the boundary value (B) depends on an elementary azimuthal angle shift and a quantizing parameter used for inverse quantizing the residual.

12. An apparatus of decoding a point cloud, from a bitstream of encoded point cloud data representing a physical object, comprising one or more processors configured to perform the method of claim 7.

13. A non-transitory storage medium carrying instructions of program code for executing the method of claim 7.

14. An apparatus of encoding a point cloud into a bitstream of encoded point cloud data representing a physical object, comprising one or more processors configured to:
  encode, into the bitstream, azimuthal angle data representative of an azimuthal angle responsive to a capture angle of a sensor that captured a point of the point cloud, wherein encoding the azimuthal angle data is based on a boundary value that depends on sensor characteristics, and an absolute value of the azimuthal angle data is bounded by the boundary value;
  wherein encoding the azimuthal angle data further comprises:
  binarizing the azimuthal angle data into a series of binary data; and
  encoding only the binary data for which neither of the two possible values violates a condition that the absolute value of the azimuthal angle data is bounded by the boundary value.

15. The apparatus of claim 14, wherein the azimuthal angle data ($\phi_{coded}$) is obtained by quantizing a first order residual azimuthal angle ($\phi_{res,n}$) between the azimuthal angle ($\phi(P_n)$) and a prediction angle ($\phi_{pred,n}$) of the azimuthal angle.

16. The apparatus of claim 14, wherein the azimuthal angle data ($\phi_{coded}$) is obtained by adding an offset value that depends on the boundary value (B) to an intermediate azimuthal angle data ($\phi'_{coded}$) that depends on a second order residual azimuthal angle ($\phi_{res,n,res}$) between the first order residual azimuthal angle ($\phi_{res,n}$) and a prediction ($\phi_{res,n,pred}$) of the first order residual azimuthal angle ($\phi_{res,n,pred}$).

17. The apparatus of claim 16, wherein the offset value is the product of an integer value ($n_{B,enc}$) by 2B+1, where B is the boundary value, the integer value ($n_{B,enc}$) ensuring the absolute value of the azimuthal angle data ($\phi_{coded,n}$) is bounded by the boundary value B.

* * * * *